United States Patent [19]
Butler et al.

[11] 3,920,133
[45] Nov. 18, 1975

[54] BALE POSITION SENSING AND CONTROL MECHANISM

[75] Inventors: L. Dennis Butler, Kingsburg; Anthony E. Furtado, Riverdale, both of Calif.

[73] Assignee: Sperry Rand Corporation, New Holland, Pa.

[22] Filed: May 24, 1974

[21] Appl. No.: 473,262

[52] U.S. Cl. .................. 214/6 B; 214/508
[51] Int. Cl.² ................ A01D 87/12; B65G 57/32
[58] Field of Search ................ 214/6 B, 508

[56] References Cited
UNITED STATES PATENTS

| | | | |
|---|---|---|---|
| 3,330,424 | 7/1967 | Grey et al. | 214/6 B |
| 3,481,497 | 12/1969 | Butler | 214/6 B X |
| 3,533,517 | 10/1970 | Heide | 214/6 DK |
| 3,549,023 | 12/1970 | Backman | 214/6 B |
| 3,612,300 | 10/1971 | Berghgracht | 214/6 DK |
| 3,687,302 | 8/1972 | Castro | 214/6 B |

Primary Examiner—Robert J. Spar
Assistant Examiner—Leslie J. Paperner
Attorney, Agent, or Firm—John R. Flanagan; Frank A. Seemar; Joseph A. Brown

[57] ABSTRACT

A bale wagon includes a trip mechanism located remote from a bale-receiving end of a first table and a bale position sensing mechanism located adjacent the bale-receiving end of the table. The trip mechanism will actuate movement of the first table for transferring a pair of bales being received thereon to a second table upon the trip mechanism being engaged, and displaced, by a leading end of the pair of bales. However, the bale sensing mechanism will prevent the trip mechanism from actuating movement of the first table until a trailing end of the pair of bales is sensed by the sensing mechanism. An override mechanism is also provided for counteracting the effect of the sensing means and allowing the trip mechanism to actuate the first table, even though the sensing mechanism has not yet sensed the trailing end of the pair of bales, whenever the trip mechanism has been engaged, and moved through a predetermined displacement, by the leading end of the pair of bales.

4 Claims, 29 Drawing Figures

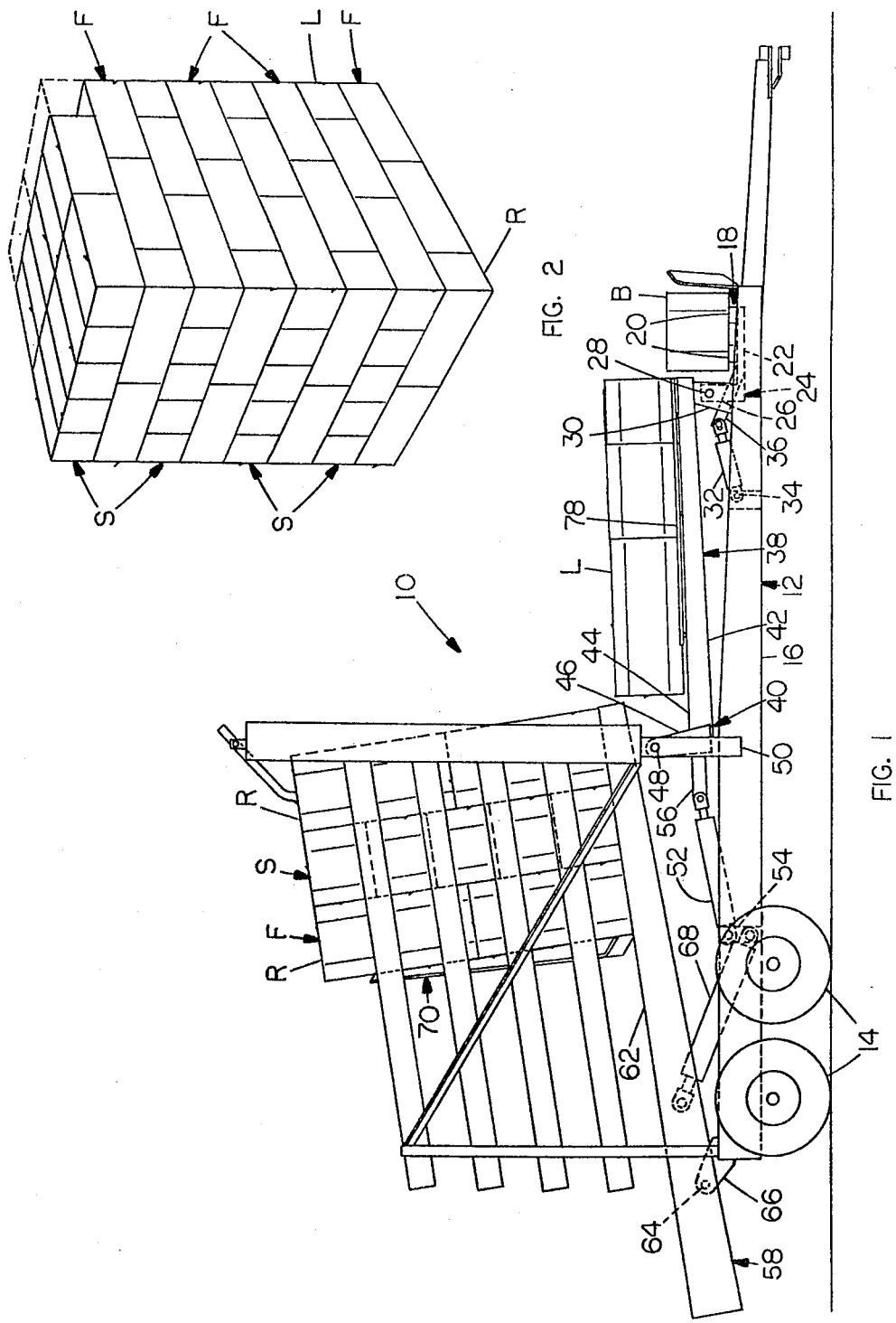

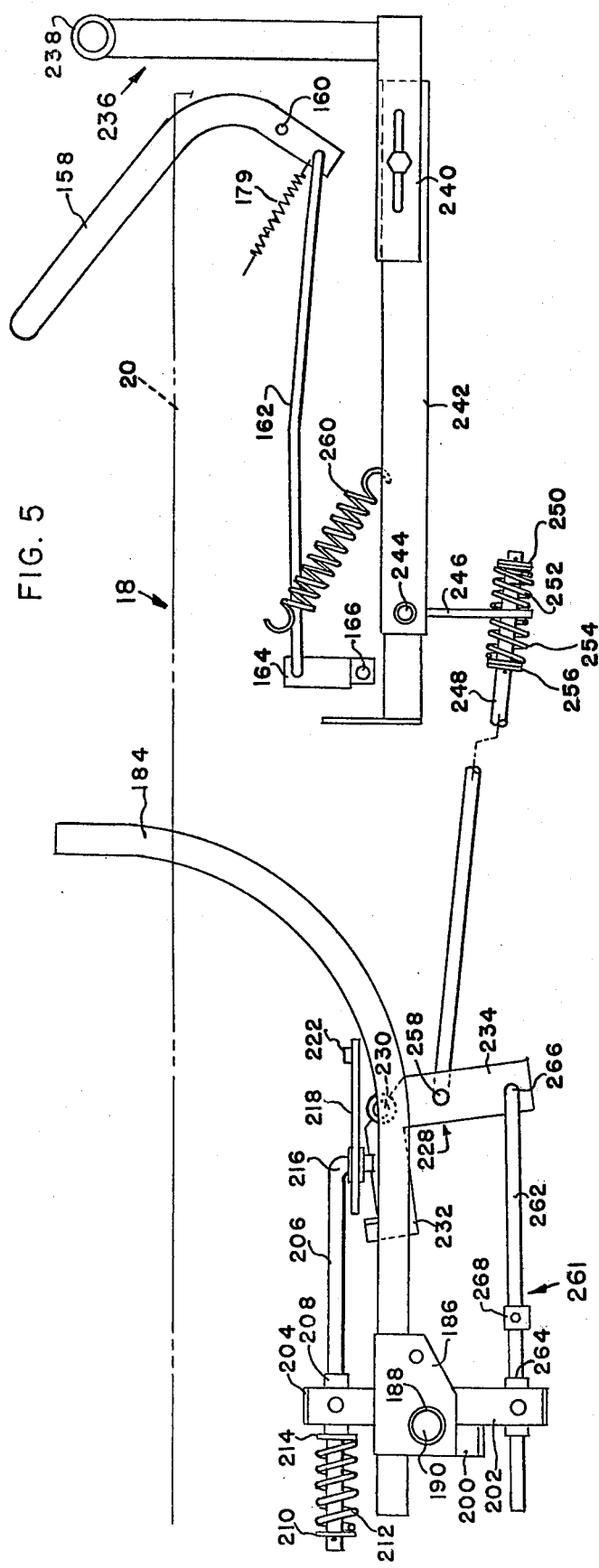
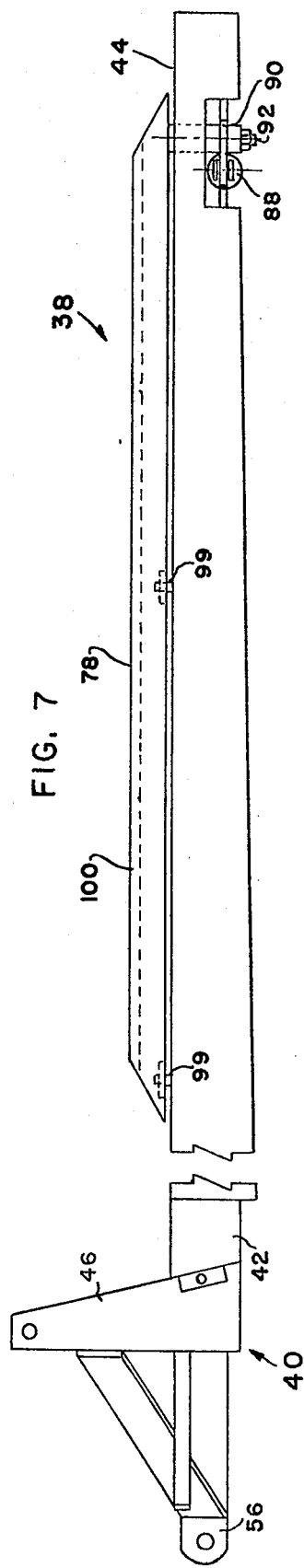
FIG. 5
FIG. 7

BALE POSITION SENSING AND CONTROL MECHANISM

CROSS REFERENCES TO RELATED APPLICATIONS

Reference is hereby made to the following co-pending U.S. applications dealing with related subject matter and assigned to the assignee of the present invention:

1. "Method and Apparatus for Forming a Pair of Two and One-Half bale Wide Tier Patterns" by L. Dennis Butler et al., U.S. Ser. No. 473,241, filed May 24, 1974.
2. "Method and Apparatus for Forming a Pair of Two and One-Half Bale Wide Tier Patterns" by Anthony E. Furtado et al., U.S. Ser. No. 473,242, filed May 24, 1974.

BACKGROUND OF THE INVENTION

1. Field of the Invention

The present invention relates generally to the art of forming a stack of crop material bales and, more particularly, is concerned with a bale position sensing and control mechanism on a bale wagon for facilitating accurate positioning of bales on the bale wagon, such as in the formation of a 2½ bale wide stack of bales.

2. Description of the Prior Art

It is accepted present day practice to form bales of crop material such as hay or the like into stacks through the employment of an automatic bale wagon. The wagons presently generally available come in two basic sizes, namely two wide and three wide machines. In a two wide machine, the bale wagon is capable of forming a stack having a width equal to the length of two bales. Similarly, a three wide bale wagon is capable of forming a stack having a width equal to the length of three bales.

Each of the commonly used two wide and three wide machines has a first table which accumulates two or three bales being arranged end-to-end, a second table which receives bales from the first table and accumulates a plurality of layers, such as four, five or six layers, of two or three bales each, which plurality of layers are commonly called a tier of bales, and a third table or load bed which receives the tiers from the second table and accumulates a plurality of the tiers, for example seven, to form a stack thereon. Once the stack has been accumulated on the load bed, it may be unloaded by pivoting the load bed 90° and depositing the stack on the ground or the like with the first tier of bales which was previously accumulated on the second table now being the lowermost tier of the stack in contact with the ground surface.

In order to enhance the stability of the stack, it is generally desirable to provide one or more tie tiers within the stack, such being tiers having individual bales arranged to overlap two bales in adjacent tiers above and below the tie tier. This can be done either manually or automatically during formation of the stack on the bale wagon, for example, in the manner illustrated and described in U.S. Pat. No. 3,395,814 or in U.S. Pat. No. 3,664,519.

However, one disadvantage of both of the presently available two wide and three wide bale wagons is that under certain crop and terrain conditions, even the tied stacks formed by these wagons do not have the desired stability and weathering characteristic. This is apparently caused by continuous vertical splits or cleavage planes which sometimes form between bales in the stacks of these wagons and are only partially interrupted by the few tie tiers being interposed within the stacks. The presence of such splits or cleavage planes is particularly detrimental to the stability of stacks formed of bales of slippery crop material, such as coastal bermuda grass, or to the stability of stacks unloaded from the bale wagon onto uneven or hillside terrain. In order to prevent these stacks from occasionally toppling over as they weather at a storage location, it is usually necessary to provide stack poles about the stack in engagement with the ground and the sides of the stack to prop up the stack sides. The presence of such splits or cleavage planes down through the stack also diminishes the weatherability of the stack by allowing moisture to penetrate down through the stack which results in a higher degree of crop material spoilage than when the moisture is restricted solely to the outer surface of the stack.

Another disadvantage of both the two wide and three wide bale wagons is that they are not adapted to provide the optimum bale capacity in a stack within the maximum highway width limitations of the laws of certain jurisdictions, such as some European countries, where the maximum width allowed is approximately 2½ meters. Specifically, the three wide wagon and its stack both exceed the 2½ meter highway width maximum limit, while the two wide wagon and its stack fail to utilize all of the space available within this maximum limit.

SUMMARY OF THE INVENTION

The 2½ bale wide stack formed by the bale wagon disclosed herein substantially overcomes the above-described disadvantages of the stacks formed by the two wide and three wide bale wagons.

First, the stack formed by the two alternating 2½ bale wide tier patterns being formed by the disclosed bale wagon has substantially all of its bales interlocked together in a manner which minimizes the probability of splits or cleavage planes forming vertically through the stack which thereby enhances the stability and weatherability of the stack and generally eliminates the necessity for using stack poles to laterally support the standing stack.

Second, the 2½ bale wagon and its stack provide the optimum utilization of the space available under the maximum highway width limitations of the laws of such European countries having the 2½ meter maximum width restriction.

The bale position sensing and control mechanism of the present invention, being incorporated into the disclosed bale wagon for forming the 2½ wide stack, facilitates the accurate positioning of bales on the bale wagon during formation of one of the two alternating tier patterns, and, in such manner, enhances the ultimate stability and weatherability of the stack.

Accordingly, in a bale wagon having a first table for accumulating a plurality of at least two bales end-to-end in a row, means for advancing bales along the first table from a bale-receiving end thereof, a second table disposed along the first table, and means for moving the first table for placing the plurality of bales on the second table, the present invention provides an improved means for controlling the actuation of the first table moving means and thus the placement of the plurality of bales on the second table.

The improved control means comprises means located remote from the first table bale-receiving end for actuating the first table moving means upon the actuating means being engaged and displaced by the leading end of the advancing plurality of bales until the trailing end of the advancing plurality of bales is sensed by the sensing means.

The improved control means further comprises means for overriding the effect of the sensing means and allowing the actuating means to actuate the first table moving means whenever the actuating means has been engaged and displaced through a predetermined distance by the leading end of the advancing plurality of bales, even though the sensing means has not yet sensed the trailing end of the advancing plurality of bales.

More particularly, the actuating means comprises a trip mechanism having a trip lever located along the first table remote from the bale-receiving end of the table. Further, the sensing means comprises a bale position sensing mechanism having a pivotal arm located adjacent the bale-receiving end of the first table and being displaced from the trip lever through a distance less than the combined length of the plurality of bales, for instance, a pair of bales and a latch for locking the trip mechanism. The arm will be engaged and pivoted to a first position by the advancing pair of bales. The trip mechanism will actuate the first table moving means when its trip lever is engaged by the leading end of the advancing pair of bales and moved in a direction away from the bale-receiving end of the first table. However, the latch of the sensing mechanism will prevent the trip mechanism from actuating the first table moving means until the trailing end of the advancing pair of bales moves past the arm which allows the arm to pivot to a second position for unlocking the latch from the trip mechanism.

Further, more particularly, the override mechanism is coupled between the trip lever of the trip mechanism and the latch of the sensing mechanism and will unlock the latch from the trip mechanism after the trip lever has been moved through the predetermined displacement by the leading end of the advancing pair of bales, even though the arm of the sensing mechanism is still maintained at its first position by the advancing pair of bales.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 1 is a side elevational view of a bale wagon embodying the principles of the present invention, showing the bale wagon with a partially formed 2½ bale wide stack of bales on its load bed and during the formation of one of the two alternating and interlocking tier patterns of bales on its second tier-forming table;

FIG. 2 is a perspective view of the stack on a smaller scale than that of FIG. 1, showing the stack after it has been rotated 90° and placed upright on the ground or the like by the bale wagon of FIG. 1;

FIG. 5 is a partial front elevational view of FIG. 4;

FIG. 7 is a side elevational view of FIG. 6;

FIGS. 24 and 25 are schematic representations of intermediate steps occurring between those steps illustrated in FIGS. 10 and 11, showing a pair of standard length bales being successively received by the first table;

DETAILED DESCRIPTION OF THE INVENTION

Figure 19:
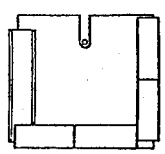
FIGS. 16 through 23 are schematic representations of the operation of forming bales into the other of the two interlocking tier patterns on the second table of the bale wagon of FIG. 1.
Figure 23:
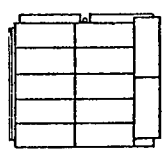
Figure 15:
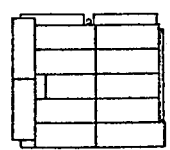
FIGS. 8 through 15 are schematic representations of the operation of forming bales into one of the two interlocking tier patterns on the second table of the bale wagon of FIG. 1.

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Referring now to the drawings, and particularly to FIG. 1, there is shown a bale wagon, being indicated generally by the numeral 10, for forming a two and one-half bale wide stack of bales, as shown in FIG. 2.

The bale wagon 10 is provided with a chassis, indicated generally as 12, mounted on left and right pairs of tandemly-arranged wheels, only the right pair of wheels 14 being shown in FIG. 1. The chassis 12 is formed of left and right longitudinally extending channels 16 (only the right channel being shown), with the forward ends thereof converging in a clevis assembly which adapts the wagon to be secured to a tractor, or other towing vehicle, located at the front of the wagon.

Mounted at the forward end of the chassis 12 and extending transversely thereto is a first receiving table, generally indicated by the numeral 18. The receiving table 18 is comprised by two transversely extending spaced beams 20 which are mounted on a forwardly extending horizontal portion 22 of an L-shaped structure 24. The structure 24 includes a rear upwardly extending leg portion 26 which is pivotally secured at 28 between spaced-apart upstanding front brackets 30, only the right one being shown, mounted on the longitudinal channel 16. A hydraulic cylinder 32 is pivotally secured at its anchor end to a transverse frame member 34 mounted between the longitudinal channels 16. The rod end of the hydraulic cylinder 32 is pivotally secured to the free end of an arm 36 which is fixedly secured to, and extends rearwardly and upwardly from, the L-shaped structure 24 of the receiving table 18. As the hydraulic cylinder 32 is extended, the receiving table 18 will swing or pivot approximately 90° upwardly about its pivot point 28 transferring any bales B which have been accumulated on the table 18 onto a second tier-forming table, being generally indicated by the numeral 38.

It will be understood by those skilled in the art, that the bales are first introduced to the receiving table 18 by means of a pickup, not shown, which is mounted to the chassis 12 at the left end of the table 18 and operative to lift bales from the ground and direct them to the left receiving end of table 18. The pickup, well known in the art, is generally similar to the one illustrated and described in U.S. Pat. No. 2,848,127 and need not be illustrated and described herein for a thorough and clear understanding of the present invention. Also, it will be understood by those skilled in the art, that a cross conveyor 39 (FIG. 3) is operatively mounted to the chassis 12 and extends between and along the two beams 20 of the first table 18 from approximately the left end to near the middle of the beams 20 for moving the bales from the pickup means toward the right end of the first table 18. The cross conveyor means, also well known in the art, is generally similar to the one illustrated and described in the aforementioned U.S. patent and need not be illustrated and described herein for a thorough and clear understanding of the present invention.

The second tier-forming table 38 is comprised by an L-shaped structure 40 (see also FIGS. 6 and 7) having a forwardly extending leg portion 42 across which is formed a bed 44 which provides a surface upon which bale tiers are formed and an upwardly extending rear leg portion 46 which is pivotally secured at 48 between spaced apart upstanding intermediate brackets 50, only the right one being shown, mounted on the longitudinal channels 16. A hydraulic cylinder 52 is pivotally secured at its anchor end to a second transverse frame member 54 mounted between the longitudinal channels 16. The rod end of the hydraulic cylinder 52 is pivotally secured to the free end of an arm portion 56 which is fixedly secured to, and extends rearwardly from, the L-shaped structure 40 of the second table 38. When the second table 38 is in its normal horizontal tier-forming position, as shown in FIG. 1, it rests at its forward end on a transverse support member, not shown, fixed to the front brackets 30. When the requisite number of bales have been accumulated on the second table 38, and formed thereon into one of two alternating, interlocking tier patterns in a manner to be described in detail hereinafter, the hydraulic cylinder 52 is actuated by trip means 57 not shown in FIG. 1 (see FIG. 3) so that it extends and causes the table 38 to swing or pivot upwardly generally 90° about its pivot point 48 to a generally vertical, tier-discharging position adjacent the front end of a rearwardly disposed load bed, or third load table, being generally indicated by the numeral 58. In this manner, the bale tier formed on the second table 38 is transferred to the load bed 58.

It will be understood by those skilled in the art, that the trip means 57 for actuating pivotal movement of the second table 38 is mounted to the chassis 12 and extends upwardly through a slot 60 formed in the middle of the table bed 44 at its rearward end. The structure and function of the second table trip means, well known in the art, is generally similar to that illustrated and described in U.S. Pat. No. 3,502,230 and need not be illustrated and described herein for a thorough and clear understanding of the present invention.

The load carrying bed 58 includes a platform assembly 62 which is pivotally mounted at 64 between spaced apart upstanding rear brackets 66, only the right one being shown, mounted on the longitudinal channels 16. A pair of spaced apart hydraulic cylinders 68, only the right one being shown, are pivotally secured at their anchor ends to the second transverse frame member 54 and at their rod ends to the platform assembly 62. When the load bed 58 is in its normal, generally horizontal tier-receiving position, as shown in FIG. 1, it rests at its forward end on upstanding intermediate brackets 50. A stack of bales is progressively formed on the load bed 58 upon successive delivery thereto of tiers of bales by pivotal movement of the second table 38 from its normal horizontal tier-forming position of FIG. 1 to its generally upright position adjacent the forward end of the load bed 58.

As the first bale tier is delivered or deposited onto the load bed 58, a fore-and-aft moveable rolling rack, being generally indicated by the numeral 70, is contacted by the tier and forced to move rearwardly along the load bed 58. It will be understood by those skilled in the art, that while the rolling rack 70 is spring biased to move toward the forward end of the load bed 58, the bias of the spring means is overcome with the delivery of each successive bale tier from the second table 38 to the front end of the load bed 58 whereby the rolling rack 70 is forced to move rearwardly one bale width until the rack 70 reaches a rearmost position along the load bed 58, whereupon a complete stack has been formed on the load bed 58. The structure and function of the rolling rack 70, well known in the art, is generally similar to that illustrated and described in U.S. Pat. No. 2,848,127 and need not be illustrated and described herein for a thorough and clear understanding of the present invention.

When the load bed 58 has been fully loaded, the stack can be transferred to the ground in the form of a composite stack by extension of the hydraulic cylinders 68 which cause the load bed 58 to pivot generally 90° about point 64 from its generally horizontal position of FIG. 1 to an upright position in which the rolling rack 70 and the rear end of the load bed 58 are disposed adjacent the ground.

THE TWO AND ONE-HALF WIDE STACK OF BALES FORMED BY THE BALE WAGON

The bale wagon of FIG. 1 incorporates various mechanical and hydraulic components which cooperate together and with some of the basic, generally well known bale wagon components, just described hereinbefore, to automatically form two alternating and interlocking bale tier patterns in a manner schematically illustrated in FIGS. 8 through 23, and, thus, adapt the bale wagon 10 to form a 2½ wide stack of bales, as shown in FIG. 2. The mechanical and hydraulic components for alternately selecting the interlocking tier patterns and for controlling the operation in forming the selected one of the tier patterns are illustrated and described in a patent application entitled "Method and Apparatus for Forming a Pair of Two and One-Half Bale Wide Tier Patterns" filed concurrently with the present application. Such components form no part of the present invention which will be described in detail hereinbelow.

While bales in either of the two tier patterns may form the base or lowermost tier of the stack which contacts the ground, a first of the two interlocking tier patterns of bales, being generally designated F and forming the base tier of the stack of FIG. 2 and the rearmost upright of the partially-formed stack of bales on the wagon load bed 58 in FIG. 1, comprises one pair of bales disposed longitudinally end-to-end in a row, and a plurality of like pairs of bales, preferably five pairs, successively disposed in transverse relationships along one longitudinally-extending side of the one pair and generally between opposite ends of the one pair of bales. The aforementioned one pair of bales of tier pattern F will be referred to hereinafter as the right rail bales R. A second of the two interlocking tier patterns of bales, being generally designated S and forming the next lowest tier of the stack of FIG. 2 and the next rearmost upright tier of the partially-formed stack of bales on the wagon load bed 58 in FIG. 1, comprises a second pair of bales disposed longitudinally end-to-end in a row, like the right rail bales R, but being aligned along the outer ends of the transversely-disposed like pairs of bales in tier pattern F at a location remote from the right rail bales R, and another plurality of like pairs of bales, also preferably five pairs, successively disposed in transverse relationships along the other longitudinally-extending side of the second pair of bales, being located opposite to the one longitudinal side of the right rail bales R, and generally between opposite ends of the second pair of bales. The aforementioned second pair of bales of tier pattern S will be referred to hereinafter as left rail bales L. It will be noted that the outer ends of the transversely-disposed like pairs of bales in tier pattern S are aligned along the upper longitudinal surface of the right rail bales R generally between opposite ends thereof. Further, it is readily apparent from FIG. 2 that the two interlocking tier patterns F, S would be identical bale arrangements if one pattern was rotated 180° about a central longitudinal axis.

Thus, the tier patterns F, S comprise the basic building blocks or units of the stack, being disposed in alternating fashion one on top of the other upwardly from the ground to the top of the stack. It should be pointed out that the left rail bales L, shown in dashed outline form in FIG. 2, of the uppermost tier, which is the last tier formed by the bale wagon 10, may be omitted during the last tier-forming operation on the wagon second table 38, which will be described in detail hereinafter, in view of the tendency of bales formed of certain crop materials to fall off the stack during pivotal unloading of the stack by operation of the wagon load bed 58 as described hereinbefore. However, the alternately-positioned right and left rails R, L of tiers F, S positioned successively below the uppermost tier are effectively locked in place in the stack by the respective outer ends of the transversely-disposed pairs of bales in the tiers F, S being engageably superimposed thereon. Further, it is readily seen that each bale in the stack above the lowermost tier engageably overlaps at least two lower bales and each bale in the stack, above the lowermost tier, being exposed at either the right or left side of the stack engageably overlaps at least one lower bale which extends in a generally transverse relationship to it. Still further, the outer end of the middle transversely-disposed pair of bales, there being one such pair in each of the tiers F, S, above the lowermost tier, engageably overlaps both of the bales forming one of the rails R, L which extend transversely to the middle pair. The enhanced stability of the stack which results from the above-described overlapping relationship between the bales of adjacent tiers is readily apparent.

In this regard, it should be brought out that the detrimental effects on stack stability which normally result from frequently encountered bale length variations, without some compensatory provision being made therefor during formation of the stack, would be a significant problem in the case of the two and one-half wide stack. In particular, the incorporation of short bales into the transversely-disposed pairs of bales would appear to result in the withdrawal of underlying support for the adjacent, overlying rail bales and, thus, outward toppling of at least the affected rail bales, if not also the adjacently positioned portion of the bale stack, since in the formation of such pairs in the first tier pattern F of the two and one-half wide stack by utilizing an inner or intermediate trip mechanism, as it is generally known heretofore in the art, for controlling the actuation of the first table, all of the undesired length variation would appear along the outer left longitudinal side of the stack.

However, such problem is substantially obviated in the bale wagon 10 by one of the aforementioned mechanical components, which comprises the present invention, being incorporated in the wagon 10. Such component is a mechanism, generally indicated by numeral 72 in FIGS. 4 and 5, for tripping the first table and sensing and controlling the position of the two bales which are intended to form one of such transversely-extending pairs in the first tier pattern F, during their delivery along the first table 18. The mechanism 72 is incorporated specifically into a first table outer trip mechanism, generally designated by numeral 74, which mechanism 74 generally is similar to that illustrated and described in U.S. Pat. No. 3,330,424. Both of the mechanisms 72, 74 will be described in detail hereinafter.

PIVOTAL RAIL-FORMING PLATFORMS ON THE SECOND TABLE

Figure 3:
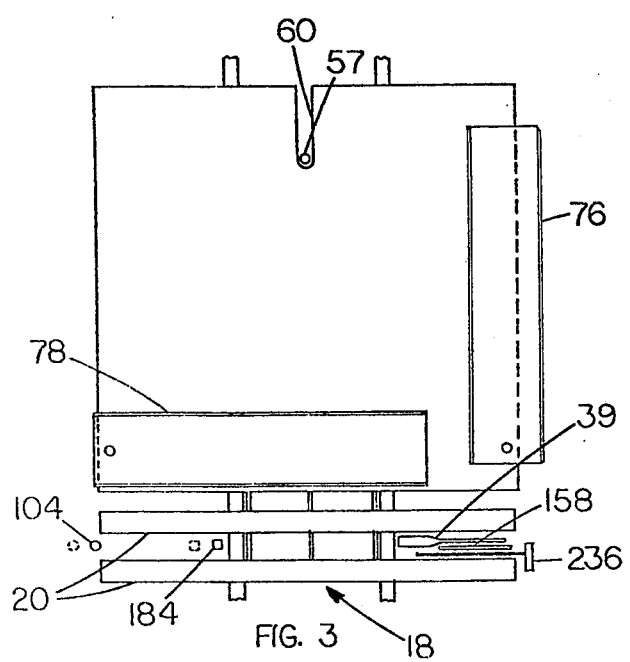
FIG. 3 is a plan view of the first and second tables of the bale wagon of FIG. 1, showing the right and left pivotal platforms on the second table for respectively positioning the pairs of longitudinally-arranged, end-to-end side bales of the two tier patterns and the locations along the first table of the first table outer trip mechanism and the first table inner trip and bale position sensing and control mechanism of the present invention.
Figure 6:
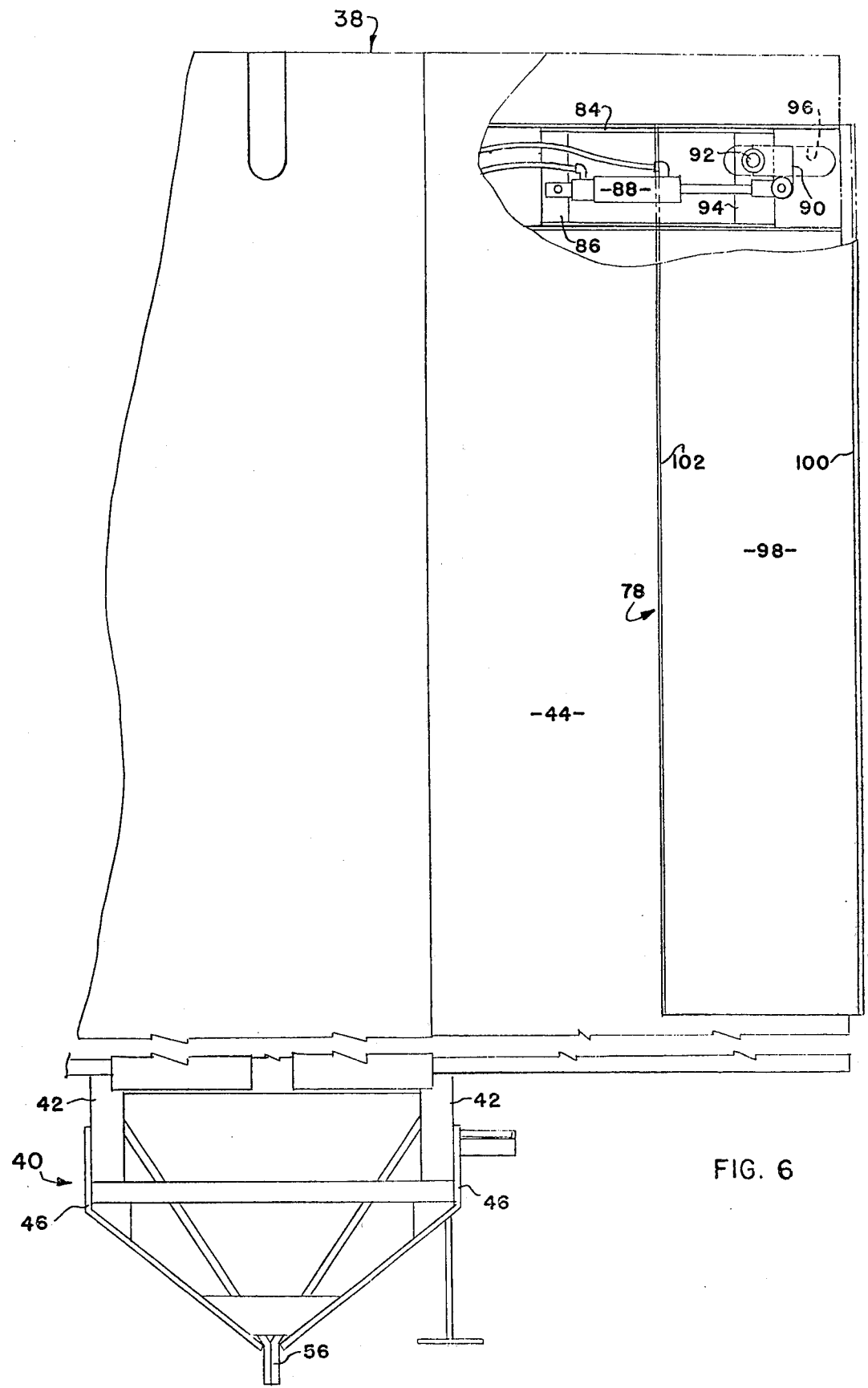
FIG. 6 is an enlarged fragmentary plan view of the second table of the bale wagon, showing the right pivotal platform on the second table and the mechanism for pivoting the platform to form the right longitudinally-arranged, end-to-end side pair of bales in the one of the two tier patterns.

The second table 38 of the bale wagon 10, as shown in FIG. 3 and in more detail in FIGS. 6 and 7, incorporates another one of the aforementioned mechanical components, that being a pair of pivotal left and right rail-forming platforms 76, 78 pivotally mounted on the second table 38 adjacent respective forward end corners thereof at 80 and 82, only the right platform being shown in FIGS. 6 and 7.

A rectangular frame 84 is mounted transversely along the forward end of the second table 38 on the underside thereof and adjacent each corner thereof. Only the structure of the frame 84 and the various structural elements associated therewith and with the right platform 78 will be described, it being understood that an identical frame and identical structures associated therewith are also associated with the left plafform 76. The frame 84 includes a cross brace 86 pivotally anchoring one end of a right hydraulic cylinder 88 having its rod end pivotally secured to a free end of a right-angled link arm 90 being, in turn, fixed to a shaft element 92 fixed to the platform 78 and rotatably mounted about a vertical pivot axis at 82 in an upstanding sleeve being fixedly carried by another cross brace 94 of the frame 84. An elongated slot 96 is transversely formed through the second table 38 for allowing passage of the shaft element 92 and lateral movement thereof along the slop 96 such that, through transverse adjustment of the frame 84, the platform 78 and its respective hydraulic cylinder may be moved as a unit to different desired positions in setting up the second table 38 to accomodate bales having different standard sizes, if such adjustment is deemed to be desirable.

When the hydraulic cylinder 88 is actuated to its extended position, as shown in FIG. 6, the right platform 78 is pivotally moved 90 degrees from its forward bale-receiving position of FIG. 3 to its side, rail-forming position of FIG. 6. Retraction of the cylinder 88 brings the platform back to its forward position of FIG. 3. The platform 78 is formed by a narrow elongated, generally planar bed portion 98 having an overall length nearly approximating the combined lengths of two average bales and somewhat shorter than the length or width of the second table 38. The width of the bed portion 98 also approximates the width of an average bale. The platform 78 has two spaced apart, rotatably mounted rollers 99 for carrying the platform 78 in its movement across the second table bed 44. The platform 78 further has opposing lips 100, 102 running respectively along opposite longitudinal edges of the platform 78. The outer or rearward lip 100, which ever it is depending on where the platform 78 is positioned, has a greater height than the forward or inner lip 102 for preventing the bales being delivered thereto by the first table 18, when the platform 78 is in its forward position, from sliding rearwardly past the platform 78 and also for maintaining the rail bales R in its desired position. The two lips 100, 102 when considered together, in a manner of speaking, provide sideboards for maintaining the rail upon the platform bed portion 98. When the platform 78 is in the side position shown in FIGS. 1 and 6, it should be noted that the lips 100, 102 generally extend parallel to the direction of movement of the transversely-disposed pairs of bales during positioning and moving of the pairs rearwardly along the second table bed 44 whereby the tier-forming operation is not hindered by the presence of the right platform 78 when it is not, strictly speaking, in use. However, the lips 100, 102 do generally contribute to the maintaining of the original positional relationship of the transverse bale pairs, as established when they are first placed on the second table 38, with reference to the right side of the second table 38 and the facing longitudinal side of the left rail bales L. Although, the above-cited advantages were explained with reference to right platform 78, they have equal application in the case of left platform 76.

FIRST TABLE OUTER TRIP MECHANISM

In order to systematically perform the steps involved in the formation of each of the interlocking tier patterns F, S by the bale wagon 10, a pair of bales must be delivered to the first table 18 and disposed therealong, preferably on their "flat" (wire or twine bearing) sides as shown in FIG. 1, at one of two predetermined positions, depending upon which particular step of the tier-forming operation is to be subsequently carried out, before the first table 18 is actuated so as to pivotally cycle and deposit the pair of bales, preferably on their "edge" (non-wire or -twine bearing) sides as shown in FIG. 1, on the front edge portion of the second table 38 at a position therealong corresponding to the one of the two predetermined first table positions. The mechanical components being incorporated into the bale wagon 10 for insuring that the pair of bales will be disposed at a selected one of the two predetermined positions are the first table outer trip mechanism 74 and the first table inner trip and bale position sensing and control mechanism 72 of the present invention.

Figure 4:
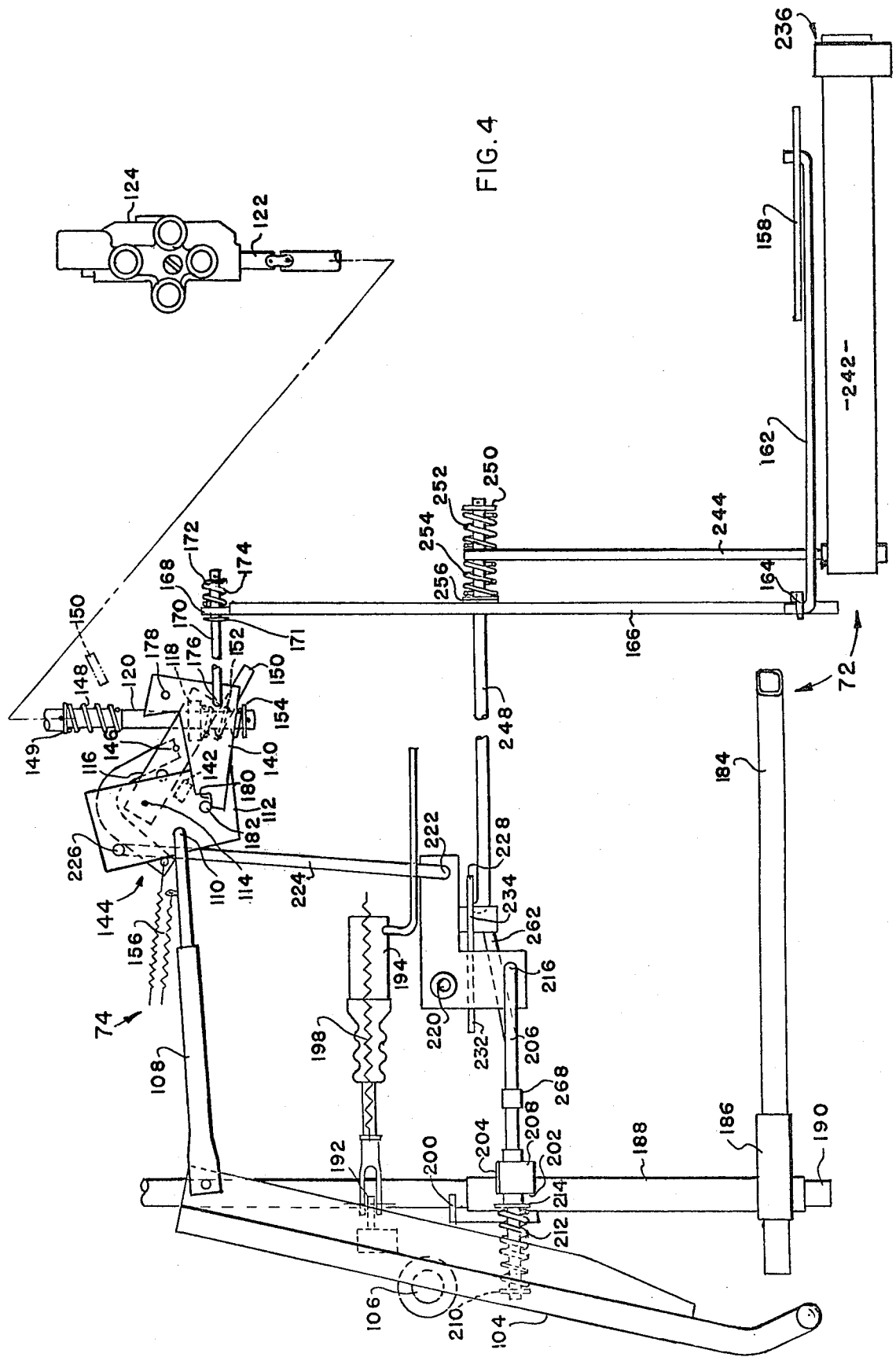
FIG. 4 is an enlarged fragmentary plan view of the outer and inner trip and bale position sensing and control mechanisms generally underlying the first table and the front portion of the second table of the bale wagon.

The first table outer trip mechanism 74, being shown in detail in FIGS. 4 and 5, includes an outer trip lever 104, shown also schematically in FIG. 3 but not shown in FIG. 5, being pivotally mounted about a vertical axis at 106 to a transverse frame member (not shown) which extends laterally outwardly from the right longitudinal channel 16. The lever 104 is pivotally coupled at one end to an adjustable rod 108 which is, in turn, pivotally secured at 110 to an actuating plate 112 being pivotally secured at 114 about a vertical axis to a bracket (not shown) fixed to the outer side of the right channel 16. Also mounted at 114 below the plate 112 for pivotal movement independently of the plate 112 is a link 116 which is also slideably coupled at 118 along one end of a rod 120 which is pivotally secured to the outer end of a spool 122 of a first table hydraulic control valve 124 for controlling the operation of the first table hydraulic cylinder 32.

As shown in FIG. 4, the spool 122 is in its "out" position. In such position, hydraulic fluid will not flow to the cylinder 32, and thus extension of the cylinder 32 and pivotal cycling of the first table 18 is prevented. Thus, when control valve spool 122 is in its "out" position, the first table hydraulic cylinder 32 is maintained inoperative at its contracted position and the first table 18 is disposed in its generally horizontal bale-receiving position of FIG. 1. When the control valve spool 122 is moved to its "in" position, which connects the flow of hydraulic fluid to cylinder 32, the cylinder 32 is extended and the first table 18 is pivoted to its upright bale discharge position adjacent the front end of the second table 38. The first table 18 will be held at such position so long as the spool 122 is maintained at its "in" position.

For moving the control valve spool 122 from its "out" position to its "in" position, the outer trip lever 104 must be pivotally moved slightly clockwise about point 106, as viewed in FIG. 4, which moves adjustable rod 108 toward plate 112 which causes pivoting of plate 112, if it is not prevented from doing so by a lock latch 140 the purpose for which will be described hereinafter, in a counterclockwise manner about point 114. As the plate 112 so moves, a small block 142, being fixed to the underside of the plate 112 and protruding downwardly therefrom across the plane within which the link 116 is capable of being pivoted, will engaged the link 116 and carry it along with the plate 112, the link 116 also pivoting counterclockwise about point 114, until the link 116 reaches the effective centerline of an over-center device 144 pivotally coupled to the link 116 at 146. Upon passing the aforesaid centerline, the link 116 is further pivotally moved at an accelerated pace by device 144, independent of the movement of plate 112, and compresses a spring 148 encircling rod 120 against a washer 149 fixed thereto to move the rod 120 toward the control valve 124 which moves the spool 122 from its "out" to its "in" position. Also, the over-center device 144 maintains the link 116 in compressive engagement against the spring 148 to maintain the rod 120 displaced toward the control valve 124 and the spool 122 at its "in" position.

As stated hereinbefore, the first table 18 will be held at its upright, bale-discharge position so long as the spool 122 is maintained at its "in" position. However, it is desired to return the spool 122 to its "out" position approximately simultaneously as the first table 18 reaches its upright position so that the table 18 will only be momentarily disposed at such position. In order to accomplish the return of the spool 122, a pivotal trip arm (not shown) is mounted to the right upstanding front bracket 30 and has an upper end which extends across the path of pivotal movement of the forwardly extending horizontal portion 22 of the L-shaped structure 24 of the first table 18 near the upper end of the path and a lower end which, during pivotal movement of the trip arm and upon engagement of its upper portion by the first table 18, moves through a path which crosses the dashed outline position of a protruding member 150 fixed to the outer end of link 116, as shown in FIG. 4, and contacts the member 150 to pivotally move the link 116 back across the aforesaid centerline whereupon the over-center device 144 acts to pivotally return the line 116 at an accelerated pace to its initial position, independent of the movement of the trip arm, and compresses a spring 152 also encircling rod 120 against another washer 154 fixed at the end of the rod 120 to move the rod 120 away from the control valve 124 which moves the spool 122 from its "in" to its "out" position. Also, the over-center device 144 maintains the link 116 in compressive engagement against the spring 152 to maintain the rod 120 displaced from the control valve 124 and the spool 122 at its "out" position. It should be noted that a spring 156 is coupled to the adjustable rod 108 which will automatically return the rod 108, the plate 112 and the lever 104 to their initial positions of FIG. 4 as soon as the forward end of the pair of bales on the first table 18 are moved out of engagement with the outer end of lever 104 upon pivot movement of the first table 18 from its horizontal position. Thus, the actuation plate 112 is returned to its initial position prior to the return of link 116.

The first table outer trip mechanism 74 further includes an L-shaped trip lock lever 158, also shown schematically in FIG. 3, being pivotally mounted about a horizontal axis at 160 to another transverse frame member (not shown) which extends laterally outwardly from the left longitudinal channel 16. The lock lever 158 extends at its upper end between first table beams 20 and is pivotally coupled at its lower end near pivot point 160 to a rod 162 which extends toward the left channel 16 and is pivotally secured to the upper end of a crank arm 164 being fixed on one end of a longitudinal connecting rod 166. The connecting rod 166 extends along left channel 16 and is pivotally mounted thereto near its opposite ends by tabs (not shown) fixed to the outer side of the left channel 16. An upstanding member 168 is fixed to the opposite end of the connecting rod 166 has an opening formed through its upper end for slideably receiving one end portion of a link rod 170 have a washer 171 fixed thereto adjacent one side of member 168 and another washer 172 fixed to its outer end with a spring 174 encompassing the rod 170 between the washer 172 and an opposite side of member 168. The other end of the link rod 170 is pivotally coupled to lock latch 140 at 176, which latch 140 is pivotally mounted about a vertical axis at 178 to the bracket (not shown) on which the actuating plate 112 is mounted.

A spring 179 fixed to the transverse frame member (not shown) normally maintains the upper end of trip lock lever 158 extending above the first table beams 20 and thereby maintains the lock latch 140 in a normal locking position, as shown in FIG. 4. In its normal locking position, the lock latch 140 has a notch 180 formed therein which is aligned with a pin 182 fixed to and extending above the surface of actuating plate 112 so that until the lock latch 140 is pivotally moved counterclockwise about pivot point 178, the plate 112 will be prevented from being pivotally moved counterclockwise.

Although counterclockwise pivotal movement of the L-shaped lever 158 downwardly about point 160 by a bale received on the first table 18 causes movement of rod 162 toward the lever 158 which causes clockwise rotation of connecting rod 166 which compresses upstanding member 168 against spring 174 and causes link rod 170 to move in a direction away from lock latch 140 and pivotally move the latch 140 counterclockwise to unlock the actuating plate 112, the actuating plate 112 will not pivot counterclockwise unless simultaneously a bale engages the trip lever 104 and moves it clockwise about point 106. Such simultaneous condition is not possible until two bales have been received on the first table 18 since the trip lever 104 and the lock latch 140 are displaced from each other substantially more than the length of a single bale, but less than the length of two bales.

Furthermore, the trip lever 104 is positioned in general alignment with the right side of the second table 38 and the right end of the first table 18 so that the two bales when viewed together on the first table 18 are disposed in one of the two abovementioned predetermined positions along the first table 18 in offsetting relationship to the right of the longitudinal centerline of the second table 38 and will be deposited either on the right platform 78 when in its forward position at the beginning of the formation of tier F, as shown in FIG. 4, or on the second table 38 with the right end of the pair of bales overlying the front end of the right platform 78 when in its side position of FIG. 6 during the formation of tier S. It will also be noted that the two bales when viewed together in this right offsetting relationship are displaced at the left end thereof approximately one bale width from the left side of the second table 38.

FIRST TABLE INNER TRIP AND BALE POSITION SENSING AND CONTROL MECHANISM

In order to provide a pair of bales along the first table 18 in the other of the two abovementioned predetermined positions in which the bales, when viewed together as a unit, will be disposed in offsetting relationship to the left of the longitudinal centerline of the second table 38, a first table inner trip and bale position sensing and control mechanism 72, comprising the preferred embodiment of the present invention, is provided which utilizes the actuating plate 112, trip lock lever 158 and lock latch 140 of the first table outer trip mechanism 74 in actuating the operation of the first table 18 when the bales are located at the other predetermined position.

The mechanism 72 includes an inner, arcuate-shaped trip lever 184, also shown schematically in FIG. 3, being adjustably mounted by clamp 186 in transverse relationship to a sleeve 188 which is rotatably fitted on a shaft 190 being rotatably mounted at its one end adjacent the clamp 186 on a transverse frame member (not shown) which extends laterally outwardly from the right longitudinal channel 16 and near its opposite end on the same transverse frame member (not shown) which also pivotally mounts the outer trip lever 104 of the first table outer trip mechanism 74. A crank arm 192 is fixed transversely to the opposite end of shaft 190 and pivotally coupled to the rod end of a hydraulic trip slave cylinder 194 which is pivotally anchored to the same transverse frame member last-mentioned above. The trip slave cylinder 194 is shown in FIG. 4 in its extended position.

It is preferred that the trip slave cylinder 194 be moved to its extended position, and the arcuate-shaped trip lever 184 thereby caused to pivot to its operative position in which it extends between and upwardly above the beams 20 of the first table 18 as shown in FIG. 5, each time the right platform hydraulic cylinder 88 is actuated to its extended position, as shown in FIG. 6, and the right platform 78 is thus pivotally moved from its forward to its side position. Further, it is preferred that the trip slave cylinder 194 remain in its extended position, and the inner trip lever 184 thereby maintained in its raised operative position, so long as the right platform hydraulic cylinder 88 remains in its extended position to maintain the right platform in its side position. Still further, once the right platform hydraulic cylinder 88 is returned to its retracted position, it is preferred that hydraulic fluid cease to be maintained under pressure within the slave cylinder 194 such that an extended spring 198, being coupled between the rod end of the cylinder 194 and the aforementioned latter transverse frame member near the anchor end of the cylinder 194, returns the slave cylinder 194 to its retracted position, causing the inner trip lever 184 to lower to its inoperative position below the first table beams 20. Further, it is preferred, when the right platform 78 is at its side position with the inner trip lever 184 being in its raised operative position and the left platform 76 at its forward position, upon pivotal movement of the left platform 76 to its side position to form left rail bales L of tier S that the inner trip lever 184 be lowered to its inoperative position below the first table beams 20. The aforementioned coordinated movements and positions of the inner trip lever 184 with the movements and positions of the platforms 76, 78 may be achieved by actuation by the operator of suitable manual controls provided on the bale wagon, or, preferably, automatically by the hydraulic components disclosed and illustrated in aforementioned patent applications entitled "Method and Apparatus for Forming a Pair of Two and One-Half Bale Wide Tier Patterns" filed concurrently with the present application.

In order for extension of the slave cylinder 194 to pivotally raise the inner trip lever 184, a tab 200 being fixed to, and extending radially outwardly from, the shaft 190 engages a side 202 of a vertical bracket 204 fixed to sleeve 188, when the tab 200 rotates counterclockwise with the shaft 190 due to extension of slave cylinder 194, and carries the bracket 204 and thus the sleeve 188 and inner trip lever 184 in counterclockwise rotation with the shaft 190.

The bracket 204 extends both generally upwardly and downwardly along the sleeve 188. A link rod 206 is slideably received through a tubular element 208 pivotally mounted to the upper end of the vertical bracket 204 and has a washer 210 fixed to its outer end with a spring 212 encompassing the rod 206 between the washer 210 and another washer 214 disposed adjacent one end of the tubular element 208. The opposite end of the linkrod 206 is pivotally secured at 216 to the corner of a right-angled plate 218 being pivotally mounted about a vertical axis at 220 to the same aforementioned transverse frame member (not shown) that pivotal mounts the outer trip lever 104 of the first table outer trip mechanism 74. An opposite corner of the plate 218 is pivotally secured at 222 to one end of a connecting link 224 which is pivotally secured at its other end at 226 to the actuation plate 112.

An auxilliary lock latch 228 is pivotally mounted at 230 to the same aforementioned transverse frame member (not shown) that pivotally mounts the right-angled plate 218 and includes a transverse upper latching portion 232 and a depending lower linking portion 234.

The mechanism 72 further includes a bale position sensing arm 236 which is interconnected to the auxilliary lock latch 228 for moving the latch 228 between a locking position and its unlocking position shown in FIG. 5. The arm 236, shown schematically in FIG. 3, includes an upstanding bale sensor 238 having a short lower transverse section 240, and a long transverse tubular member 242 having the short transverse section 240 of the sensor 238 telescopically received and adjustably secured on its outer end. The member 242 extends toward the left channel 16 (not shown) and is secured on one end of a connecting rod 244. The connecting rod 244 extends along the left channel 16 and is rotatably mounted through the same transverse frame member (not shown) that pivotally mounts the trip lock lever 158 of the first table outer trip mechanism 74. A depending member 246 is fixed to the opposite end of the connecting rod 244 and has an opening formed through its lower end for slideably receiving one end portion of a link rod 248 having a washer 250 fixed to its outer end with a spring 252 being disposed about the one end portion of the rod 248 between the washer 250 the lower end of depending member 246. Another spring 254 is disposed about the one end portion of the rod 248 on an opposite side of the lower end of depending member 246 between the lower end thereof and another washer 256 being spaced a short distance therefrom and fixed to the link rod 248. The other end of the link rod 248 is pivotally coupled to the depending linking portion 234 of the auxilliary lock latch 228 at 258.

As was stated earlier in this application, the incorporation of short bales into the pairs of transversely-disposed pairs of bales forming the first tier pattern F could be a significant problem in the case of a two and one-half wide stack if a first table inner trip mechanism was utilized which functioned generally the same as the first table outer trip mechanism 74, that is, it only would sense the position of the pair of bales along the first table 18 at the right end thereof. As pointed out hereinbefore, such bale position sensing method when applied to the transversely-disposed pairs of bales of the first tier pattern F would result in the formation of a void or gap between the left end of the pair and the left side of the second table 38 at which location the detrimental effect of a gap or void on stack stability is readily understood. However, the bale position sensing and control mechanism 72 incorporated into the bale wagon 10 senses and controls the position of a pair of bales with respect to two reference point, instead of just one, such points capable of being accurately established respectively at both right and left ends of the pair of bales by the mechanism 72.

The right reference point is established by adjusting the inner trip lever 184 with respect to its pivotal axis so that when the lever 184 is pivoted upwardly upon being contacted by the leading bale of the pair being moved along the first table 18 by the cross conveyor, it would actuate pivotal movement of the first table 18, in the absence of lock latch 140 and auxiliary lock latch 228, when the leading bale has reached a position spaced a short distance from the left side of the right rail bales R, for example, four inches. In effect, by so adjusting the inner trip lever 184, the capability of creating a gap or void between the right end of the bale pair and the left side of the right rail bales R is stored in the inner trip lever 184, since the left reference point is most desirably established, through adjustment of the position of the upstanding bale sensor 238 along the tubular member 242, at a location being displaced from the left side of the right rail bales R through a distance approximately equal to two times the average or standard length of the bales being stacked. Such location generally falls in alignment with the outside longitudinal edge of the left platform 76 when in its side position.

Figure 13:
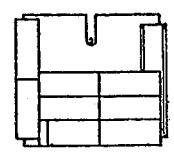
Figure 27:
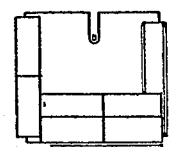
FIGS. 26 and 27 are schematic representations of intermediate steps occurring between those steps illustrated in FIGS. 12 and 13, showing a pair of bales being successively received by the first table where one of the bales is significantly shorter than the standard bale length.
Figure 11:
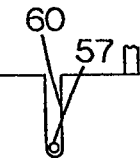
Figure 25:
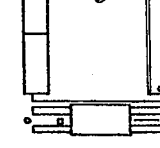

Therefore, given the above two reference points, if the bales in the pair delivered across the first table 18 are both equal to the average or standard length, such being represented schematically in FIGS. 24 and 25, the inner trip lever 184, although being preset for a four inch gap, will not trip the first table 18 until the left end of the pair passes by the bale sensor 238 at which moment a spring 260 fixed between the tubular member 242 and the transverse frame member (not shown) pivots the arm 236 upwardly to its normal position of FIG. 5. When the arm 236 is in such position and the trip lever 158 being depressed, both lock latches 140 and 228 are in their unlocked position and actuation of the first table 18 occurs. Thus, since such pair of two average-length bales upon actuation of the first table 18 are positioned at their left end toward the right end of the first table just pass the bale sensor 238, the left end of the bales will fall on the desired alignment for that side of the tier F and the right end will be substantially flush against the left side of rail bales R, as seen in FIG. 11. If the overall length of the pair of bales was short four inches as seen in FIG. 27, it is readily apparent that a four inch gap would be created adjacent the left side of the rail bales R, but that the left end of the pair would fall on the desired alignment with the left reference point, as seen in FIG. 13.

Figure 29:
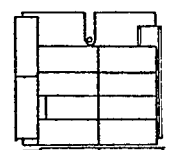
FIGS. 28 and 29 are schematic representations of intermediate steps occurring between those steps illustrated in FIGS. 14 and 15, showing a pair of bales being successively received by the first table where one of the bales is significantly longer than the standard bale length.

Suppose a long bale is encountered, such as shown in FIG. 29, it will be noted that, on the basis of the above-described adjustments of the innter trip lever 184 and the bale sensor 238 of the bale position sensing arm 236, the arm 236 will not be allowed to pivot upwardly to its normal unlocking position for actuating the first table 18 since the left end of the pair will come to rest on the bale sensor 238. As seen in FIGS. 4 and 5, an override device, generally designated 261, is incorporated in the mechanism 72 to compensate for this contingency. The device 261 includes a connecting rod 262 being slideably received at one end through a tubular element 264 pivotally mounted to the lower end of the vertical bracket 204 and pivotally coupled at its other end at 266 to the lower end of the depending lower linking portion 234 of the auxilliary lock latch 228. Further, an adjustable stop 268 is secured along the rod 262 a small predetermined distance from the tubular element 264 which distance is preset so that, just slightly after the inner trip lever 184 has moved through its normal displacement, the element 264 will engage the stop 268 and then move the rod 262 to unlock the auxilliary lock latch 228 to actuate the first table 18 even though the arm 236 remains in its locking position. Thus, the override device 261 insures that the auxilliary lock latch 228 is unlocked when ever the preselected gap stored on inner trip lever 184 has been used up.

While the inner trip and bale position sensing and control mechanism 72 of the present invention has been illustrated and described herein in connection with the formation of the pair of interlocking, two and one-half bale wide tier patterns F, S, it is believed to be adaptable for use in other bale wagons wherein it would be desirable to accurately position a plurality of at least two bales along the first receiving table for delivery of the bales to a correspondingly accurate position on the second tier-forming table of the bale wagon.

FORMING BALES INTO TWO ALTERNATING, INTERLOCKING TIER PATTERNS ON THE SECOND TABLE OF THE BALE WAGON

FIGS. 8 through 15 and 16 through 23 schematically illustrate the operations of forming bales into the first and second interlocking tier patterns F, S on the second table 38 of the bale wagon 10 of FIG. 1 as the bale wagon 10 moves across the field. Reference numerals have been omitted for purposes of clarity from FIGS. 8 through 23 (and also from FIGS. 24 through 29), since the basic components involved in the operations have been identified in FIG. 3.

Figure 10:
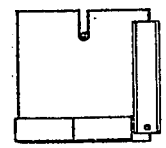
Figure 9:
Figure 8:
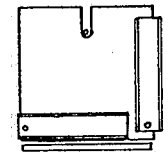

Since formation of bales into tier pattern F has been selected first and is illustrated in FIGS. 8 through 15, the right platform 78 is at its forward position and the left platform 76 is at its side position, as illustrated in FIG. 8. Also, inner trip lever 184 is disposed in its lower, inoperative position. The operations begin with two bales being successively delivered along the first table 18 until both trip lock lever 158 is depressed and outer trip lever 104 is pivotally moved to the left. Then, the first table 18 is actuated to pivot to its upright, bale-discharging position to deliver the pair of bales to the second table 38 and thereby dispose the pair on the right platform 78 with the pair being arranged end-to-end in a row thereon, as shown in FIG. 9. Return movement of the first table 18 back to its horizontal, bale-receiving position causes pivotal movement of the right platform 78 and its pair of bales to the side position, as shown in FIG. 10, being generally perpendicular to the initial forward position, which provides the right pair of rail bales R for the tier pattern F. Upon such pivotal movement of the right platform 78, the inner trip lever 184 is actuated to its raised, operative position.

To complete formation of the tier pattern F, like pairs of bales are each successively delivered along the first table 18 until trip lock lever 158 is depressed, bale position sensing arm 236 senses the passage of the right end of the pair (or override device 261 is actuated in the case of an overly long bale), and inner trip lever 184 is pivoted to the left and then delivered by the first table 18 to the second table 38 and thereby disposed or accumulated in transverse relationships along one longitudinally-extending side of the right pair of rail bales R and generally between opposite ends of the pair, as shown in FIGS. 11 through 15.

Figure 16:
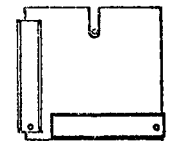
Figure 20:
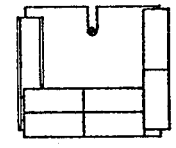
Figure 12:
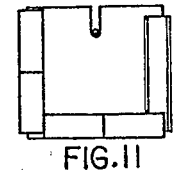
Figure 26:
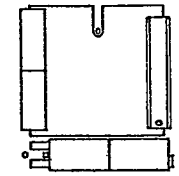

When the final pair of bales is delivered to the second table 38 to complete the tier pattern F, the rearwardly-positioned transverse pair of bales of the tier pattern F engage and move the second table trip lever 57 rearwardly which actuates pivotal movement of the second table 38 to its upright, tier-discharging position adjacent the load bed to dispose the iter of bales upright upon the load bed. Return movement of the second table 38 back to its horizontal, tier-forming position causes pivotal movement of the left platform 76 to the forward position with the right platform 78 being maintained at the side position, as illustrated in FIG. 16, and, also, the inner trip lever 184 is still maintained in its raised, operative position.

Figure 18:
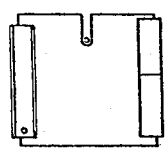
Figure 22:
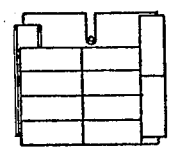
Figure 14:
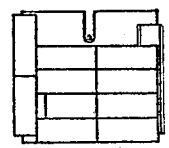
Figure 28:
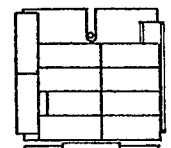
Figure 17:
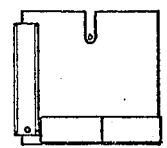
Figure 21:
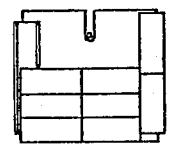

Accordingly, formation of bales into the other, second tier pattern S, which had been selected by the prior upward movement of the second table 38 in delivering tier F to the load bed, is now carried out and is illustrated in FIGS. 16 through 23. The operation begin with two bales being successively delivered along the first table 18 as the like pairs of bales were previously each successively delivered along the first table 18 to complete formation of the tier pattern F. Then, the first table 18 is actuated to pivot to its upright, bale-discharging position to deliver the pair of bales to the second table and thereby dispose the pair on the left platform 76 with the pair being arranged end-to-end in a row thereon, as shown in FIG. 17. Return movement of the first table 18 back to its horizontal, bale-receiving position causes pivotal movement of the left platform 76 and its pair of bales to the side position, as shown in FIG. 18, being generally perpendicular to the initial forward position, which provides the left pair of rail bales L for the tier pattern S. Upon such pivotal movement of the left platform 76, the inner trip lever 184 is actuated to its lower, inoperative position.

To complete formation of the tier pattern S, like pairs of bales are each successively delivered along the first table 18 until both trip lock lever 158 is depressed and outer trip lever 104 is pivotally moved to the left and then delivered by the first table 18 to the second table 38 and thereby disposed or accumulated in transverse relationships along a longitudinally-extending side of the left pair of rail bales L, being located opposite to the one longitudinal side of the right pair of rail bales R, and generally between opposite ends of the pair, as shown in FIGS. 19 through 23.

When the final pair of bales is delivered to the second table 38 to complete the tier pattern S, the rearwardly-positioned transverse pair of bales of the tier pattern S actuates the second table trip lever 57, as in the case of the tier pattern F, which causes pivotal movement of the second table 38 to its upright, tier-discharging position adjacent the load bed to deposit the tier S upright upon the load bed in general alignment with the tier F such that the right rail bales R of tier F and the left rail bales L of tier S are respectively disposed at opposite sides of the adjacently deposited tiers F, S.

Additional interlocking tiers F, S are successively and alternately formed and deposited onto the load bed by repeating the above-described operations until a stack having the desired number of tiers has been formed on the load bed of the bale wagon. Then, the bale wagon 10 is moved to a desired storage location, whereupon the load bed is pivoted 90° to its upright position, push-off feed (not shown) are actuated and the wagon is moved forwardly which deposits the stack upright upon the ground or the like, as it is shown in FIG. 2.

It is thought that the invention and many of its attendant advantages will be understood from the foregoing description and it will be apparent that various changes may be made in the form, construction and arrangement of the components of the bale wagon described without departing from the spirit and scope of the invention or sacrificing all of its material advantages, the form hereinbefore described being merely a preferred or exemplary embodiment thereof.

Having thus described the invention, what is claimed is:

1. In a bale wagon having a first table for accumulating a plurality of at least two bales end-to-end in a row, means for advancing bales along said first table from a bale-receiving end thereof, means disposed along said first table for receiving said bales therefrom and accumulating bales into a tier thereof, and means for transferring said bales from said first table to said tier-accumulating means, an improved means for controlling the actuation of said transferring means and thus the placement of said plurality of bales with respect to said tier-accumulating means upon being transfer thereto, comprising:
    means located remote from said bale-receiving end of said first table for actuating said transferring means upon being engaged and displaced by a leading end of a first of said plurality of bales received on said first table; and
    means for sensing a trailing end of a last of said plurality of bales received on said first table, said sensing means also for preventing said actuating means from actuating said transferring means upon said actuating means being engaged and displaced by said leading end of said first of said plurality of bales received on said first table until said last of said plurality of bales is received on said first table and said trailing end of said last bale is sensed by said sensing means.

2. In a bale wagon having a first table for accumulating a plurality of at least two bales end-to-end in a row, means for advancing bales along said first table from a bale-receiving end thereof, a second table disposed along said first table, and means for moving said first table for placing said plurality of bales on said second table, an improved means for controlling the actuation of said first table moving means and thus the placement of said plurality of bales on said second table, comprising:
    means located remote from said bale-receiving end of said first table for actuating said first table moving means upon being engaged and displaced by a leading end of said advancing plurality of bales;

means for sensing a trailing end of said advancing plurality of bales, said sensing means also for preventing said actuating means from actuating said first table moving means upon said actuating means being engaged and displaced by said leading end of said advancing plurality of bales until said trailing end of said advancing plurality of bales is sensed by said sensing means; and means for overriding the effect of said sensing means and allowing said actuating means to actuate said first table moving means whenever said actuating means has been engaged and displaced through a predetermined distance by said leading end of said advancing plurality of bales, even though said sensing means has not yet sensed said trailing end of said advancing plurality of bales.

3. In a bale wagon having a first table for accumulating a plurality of at least two bales end-to-end in a row, means for advancing bales along said first table from a bale-receiving end thereof, a second table disposed along said first table, and means for moving said first table for placing said plurality of bales on said second table, an improved means for controlling the actuation of said first table moving means and thus the placement of said plurality of bales on said second table, comprising:

a trip mechanism having a trip lever located along said first table remote from said bale-receiving end thereof, said trip mechanism for actuating said first table moving means when its trip lever is engaged by a leading end of said advancing plurality of bales and moved in a direction away from said bale-receiving end of said first talbe;

a bale position sensing mechanism having a sensing arm located adjacent said bale-receiving end of said first table for sensing a trailing end of said advancing plurality of bales and a latch for locking said trip mechanism so as to prevent said trip mechanism from actuating said first table moving means until said trailing end of said advancing plurality of bales is sensed by said sensing arm; and an override mechanism being coupled between said trip lever of said trip mechanism and said latch of said sensing mechanism for unlocking said latch from said trip mechanism after said trip lever has been engaged and moved through a predetermined displacement by said leading end of said advancing pair of bales, even though said sensing arm of said sensing mechanism has not yet sensed said trailing end of said advancing plurality of bales.

4. A bale wagon as recited in claim 3, wherein said arm is engaged and moved by said advancing plurality of bales to a first position in which it causes said latch to lock said trip mechanism and said arm senses said trailing end of said advancing plurality of bales when said trailing end advances past said arm and disengages therefrom to allow said arm to move to a second position in which it unlocks said latch from said trip mechanism.

* * * * *